Oct. 30, 1928.
R. W. OLSON
SCRAPER
Filed June 4, 1926
1,689,747
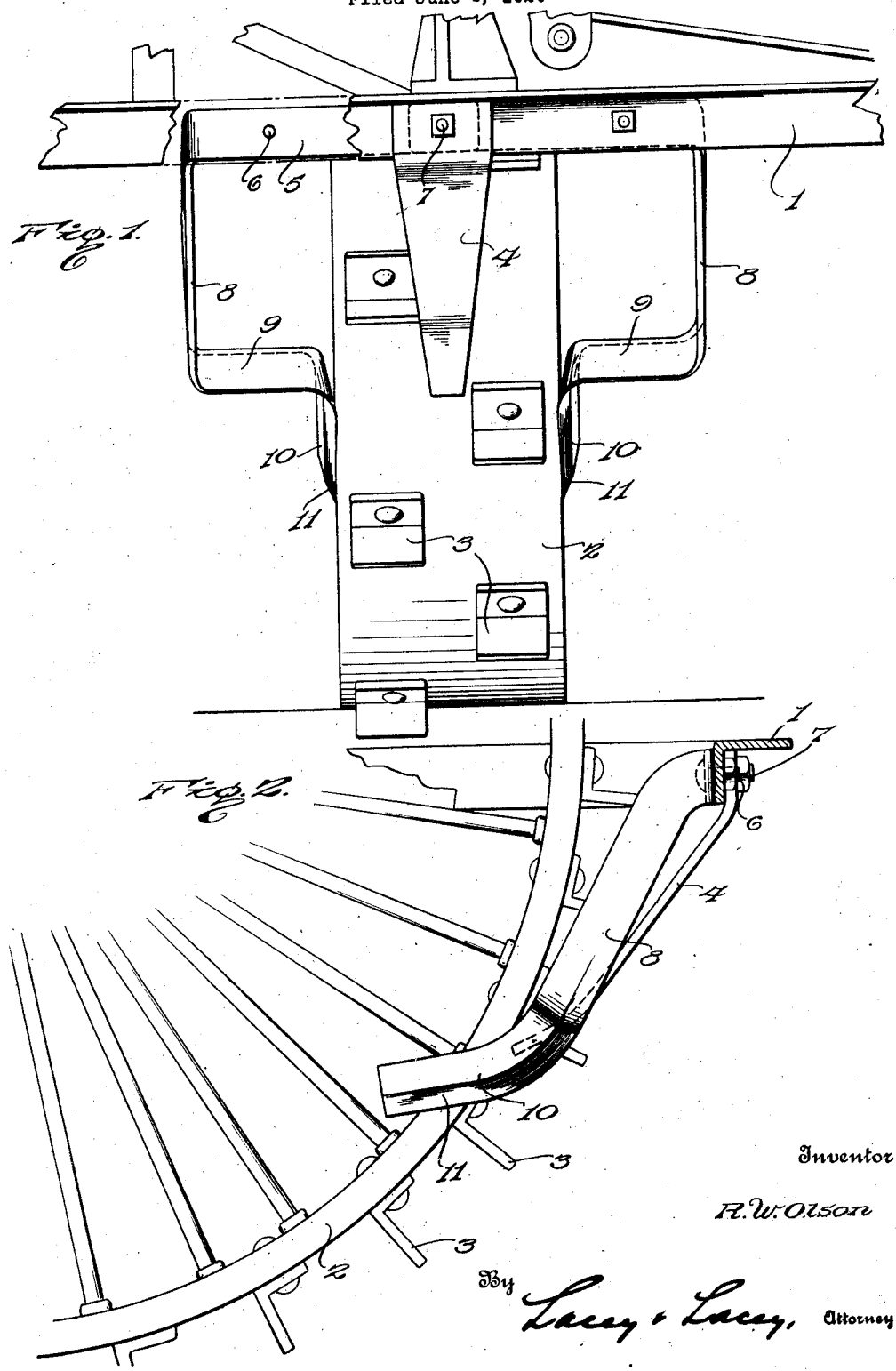
Inventor
R. W. Olson
By Lacey & Lacey, Attorneys Patented Oct. 30, 1928.

1,689,747

UNITED STATES PATENT OFFICE.

ROBERT W. OLSON, OF AMBOY, MINNESOTA, ASSIGNOR OF ONE-HALF TO MELVIN W. KEITH, OF AMBOY, MINNESOTA.

SCRAPER.

Application filed June 4, 1926. Serial No. 113,804.

This invention is a device for removing mud and like accumulations from wheels and is more particularly designed for application to corn harvesters and similar machines. Corn harvesters and like machines are now very generally provided with ground wheels having traction lugs secured upon their circumferences in two rows, and a clearing finger is secured to the frame of the machine in position to work between the two rows of traction lugs and thereby remove from the wheel the mud and other matters which accumulate upon the lugs. These clearing fingers are only partly successful, however, and it always happens that, in muddy fields, the mud is taken up by the traction lugs. As the traction wheels revolve, the mud accumulates between the side of the wheel and the chain guard, some falling over the chain guard onto the chain which carries the mud to the sprockets on which the mud sticks, tightening the chain so that there is danger of breaking the chain or springing the shaft. The mud, accumulating between the guard and the drive wheel, becomes packed so tight as to force the guard against the chain, and, in many instances, the guard springs the chain and causes it to climb the sprocket teeth and jump off the sprockets. Once a chain has been sprung, it is practically impossible to keep it on the sprockets. Due to the accumulation of mud, the chain is tightened, and the friction of the chain against the guard and the tendency of the chain to climb the sprockets increase the resistance to such an extent that the drive wheels slide and it is almost impossible to move the machine at all. My invention provides a very simple and inexpensive device whereby the mud, straw or other matters which tend to adhere to the ground wheels and be carried around by them are stripped therefrom so that there is no interference with the proper operation of any of the working parts. The invention is illustrated in the accompanying drawing and will be hereinafter fully set forth.

In the drawing:

Figure 1 is a rear elevation of a portion of a machine having my invention applied thereto, parts of the structure being broken away in order that other parts may be more clearly shown;

Fig. 2 is a side elevation, with a part in section, of so much of a wheel and the frame of the machine as is needed to disclose the invention.

In the drawing, the reference numeral 1 indicates a part of the frame of an agricultural machine, 2 indicates a portion of a ground wheel having traction lugs 3 thereon, and 4 designates the clearing finger now very generally secured to a rear portion of the machine frame and so arranged that its free end will be in a diametrical plane of the wheel between the planes of the rows of traction lugs, as will be understood upon reference to Fig. 1.

In carrying out my invention, I provide a pair of scrapers each having an upper transversely extending attaching arm 5 which is adapted to fit flat against that beam or portion of the machine frame to which the clearing finger 4 is attached and be secured thereto near its outer portion by a bolt 6. The inner ends of these attaching arms 5 may overlap, as indicated by the dotted lines in Fig. 1, and be secured to the frame by the same bolt 7 which secures the clearing finger 4 thereto, although this will depend on their size and the type of frame to which they are applied, it being understood that the device of my invention is provided in rights and lefts with one member of each pair disposed at each side of the ground wheel. From the outer end of the attaching arm 5, an intermediate shank or hanger portion 8 extends downwardly and forwardly in spaced relation to the side of the wheel and preferably in a plane parallel therewith. At the lower end of each hanger portion 8 is an inwardly extending web 9 which extends nearly to the side of the wheel and then merges into a downwardly and forwardly extending blade 10 fitting closely against the side of the wheel and having its lower edge sharpened, as indicated at 11, whereby it will cut or scrape from the side of the wheel all mud or other matter adhering thereto and projecting therefrom. The peculiar form of the scraper tool imparts some resiliency thereto so that the blade will be held closely to the ground wheel but will not interfere with the free rotation of the same. The blade will be held in contact with the wheel, however, with sufficient force to thoroughly remove all matters adhering thereto and projecting beyond the sides thereof and, consequently, those matters cannot drop onto any of the working parts of the machine. It is also to be noted that the scraper blades bear against the wheel substantially in the same horizontal plane as the end of the clearing finger 4 so that the scrapers coöperate with said finger to remove the mud and other matter. Consequently, the upper portion of the wheel is freed of accumulations which tend to clog the same or cause uneven travel of the machine and actual experience has demonstrated that nearly always the upper portion of the wheel is entirely free of all extraneous matter. My device can be very cheaply produced and can be easily applied to any machine now in use or hereafter built. The spaced relation of the hanger portions of the tool with the wheel serves to maintain the resilient action of the blades and lower ends of the tools, while also providing open spaces through which any slight matters which may cling to the wheel or traction lugs as they pass the clearing finger may escape. The blades extend rearwardly from the wheels and then outwardly, so that there is no support for the mud and weeds after they are scraped from the wheels and they must fall to the ground.

Having thus described the invention, I claim:

The combination with a frame, and a traction wheel provided with rows of traction lugs, of a scraper finger secured to the frame and depending from the frame and bearing at its free end upon the wheel between the traction lugs, and scrapers arranged at opposite sides of the wheel and each consisting of an arm secured to the frame, a hanger member depending from the arm in laterally spaced relation to the side of the wheel, a web extending from the lower end of the hanger member to the side of the wheel, and a blade projecting forwardly from the inner end of the web in contact with the adjacent side of the wheel.

In testimony whereof I affix my signature.

ROBERT W. OLSON. [L. S.]